Figure 1:
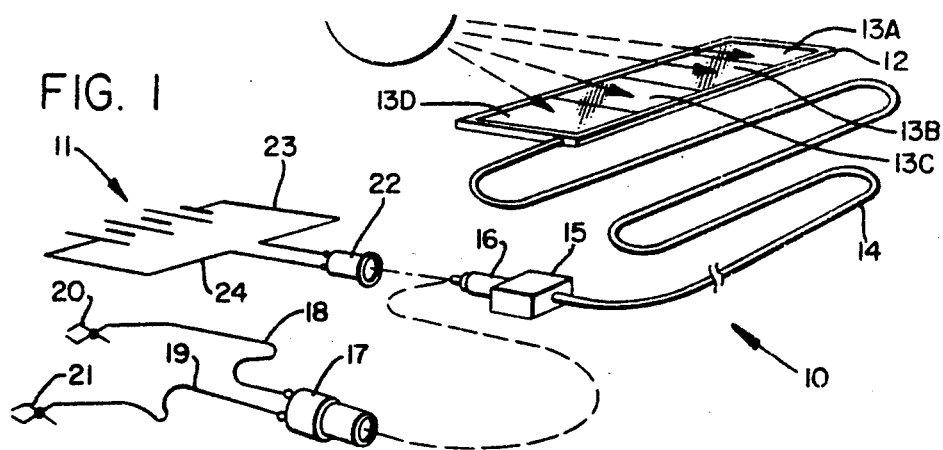

United States Patent [19]

Gali

[11] Patent Number: 5,084,664
[45] Date of Patent: Jan. 28, 1992

[54] SOLAR POWERED LEAD ACID BATTERY REJUVENATOR AND TRICKLE CHARGER

[76] Inventor: Carl E. Gali, 6414 Faircove Cir., Garland, Tex. 75043

[21] Appl. No.: 598,132

[22] Filed: Oct. 16, 1990

[51] Int. Cl.⁵ .............................................. H02J 7/00
[52] U.S. Cl. ...................................... 320/61; 320/21; 320/2; 323/906
[58] Field of Search ................ 320/2, 21, 61; 323/906

[56] References Cited

U.S. PATENT DOCUMENTS

| | | | |
|---|---|---|---|
| 3,761,795 | 9/1973 | Clayton et al. | 320/21 |
| 4,213,080 | 7/1980 | Rock | 320/21 |
| 4,274,044 | 6/1981 | Barre | 320/21 |
| 4,390,940 | 6/1983 | Corbefin et al. | 323/906 |
| 4,740,739 | 4/1988 | Quammen et al. | 320/21 |
| 4,871,959 | 10/1989 | Gali | 320/61 |

FOREIGN PATENT DOCUMENTS 2085244  4/1982  United Kingdom ............... 320/2

Primary Examiner—Steven L. Stephan
Assistant Examiner—Thomas M. Dougherty
Attorney, Agent, or Firm—Warren H. Kintzinger

[57] ABSTRACT

A solar powered lead acid battery rejuvenator circuit is provided that generates fast time very short duration pulses on the order of five micro seconds or less with a five mega volt per second rise time to 1:1 to 1:3 times the theoretical cell voltage with pulses in the approximate range of from 2,000 to 10,000 times per second. The circuit is also a trickle charger for lead acid batteries. A solar cell panel is connected to power a DC to AC inverter multivibrator having a center tap and opposite side end connections to a primary coil of a transformer. The secondary coil of the transformer, that is a fast rise time transformer in the order of two nano seconds per volt rise time transformer, has opposite end connections to two opposite side terminals of a four diode rectifier bridge. The other opposite connections of the AC to DC rectifier bridge are connected to like polarity terminals of a battery subject to rejuvenator pulse inputs and trickle charging. One of these battery circuit connections from the bridge includes a transistor connected through a voltage bias resistor to the transistor base, a resistor connected to the transistor emitter and to a terminal of the battery and also connected to a diode also connected to the transistor base.

17 Claims, 1 Drawing Sheet

SOLAR POWERED LEAD ACID BATTERY REJUVENATOR AND TRICKLE CHARGER

This invention relates in general to battery chargers, and more particularly, to a solar powered lead acid battery combination rejuvenator and trickle charger.

A characteristic of lead acid batteries is that lead sulfate deposits slowly build up on the plates to partially cover and/or replace the lead and lead dioxide plate surfaces. Low current recharging is inadequate in that it cannot, as such, sufficiently remove such deposits that with the passage of time crystallize and choke the battery plates by interfering blockage of electrolyte movement. Through the years many people have tried to dislodge these deposits by "Fast Charging", an approach that generally ultimately overheats and warps the lead plates in a battery. When this occurs a battery may still appear to have taken a charge and even the electrolyte may check as being correct but the battery does not hold the charge as the plates are effectively shorted. The transfer of electrons between metal (lead) electrodes and ions in a solution is not instantaneous. Thus, with a series of sufficiently fast rise time voltage pulses to voltage levels above the theoretical cell voltage the close to instantaneous voltage is distributed over the entire lead plate surfaces and the lead sulfation that is built up on plate surfaces will be released, either going back into the solution or broken up.

It is, therefore, a principal object of this invention to provide a solar powered combination rejuvenator and trickle chargers for lead acid batteries.

Another object is to provide such a combination rejuvenator and trickle charger capable of removing lead sulfate deposits even in the crystallized state from the lead plates of lead acid batteries.

A further object is to prevent overheating and warpage of lead plates in a battery when charging efforts are made to dislodge deposits from lead acid battery plates.

Still another object is to significantly extend the useful service life and reliability of lead acid batteries.

Features of the invention useful in accomplishing the above objects include, in a solar powered combination rejuvenator and trickle charger for lead acid batteries, a multi-solar cell unit with the number of cells reduced to as low as four cells. The cells are low voltage high current solar cells—1 to 2 volts with 1 to 2 amps output, well suited for lead acid batteries with the solar panel power connected to a DC to AC inverter multi-vibrator having a center tap and opposite end connections to a primary coil of a transformer. The secondary coil of the transformer has a higher turns ratio than the primary coil and opposite end connections to two opposite AC input terminals of a four diode rectifier bridge. The output opposite connections of the four diode AC to DC rectifier bridge are connected via two opposite polarity dc output leads one including a current limiting resistor to like polarity terminals of a battery. The leads are connected through a plug inserted into a cigarette lighter insert holder in a vehicle, or into a receptacle with two wires with end clips connectable to the terminals of a battery. The combination battery rejuvenator and trickle charger generates fast time very short duration pulses on the order of five micro seconds or less with a five mega volt per second rise time to 1:1 to 1:3 times the theoretical cell voltage with pulses in the approximate range of from 2,000 to 10,000 times per second. The secondary coil of the transformer, that is a fast rise time transformer on the order of two nano seconds per volt rise time transformer, has opposite end connections to two opposite side terminals of a four diode rectifier bridge. The other opposite connections of the AC to DC rectifier bridge are connected to like polarity terminals of a battery subject to rejuvenator pulse inputs and trickle charging. One of these battery circuit connections from the bridge includes a transistor connected through a voltage bias resistor from the transistor base, a resistor connected to the transistor emitter and to a terminal of the battery and also connected to a diode also connected to the transistor base.

Specific embodiments representing what are presently regarded as the best modes of carrying out the invention are illustrated in the accompanying drawing.

Figure 2:
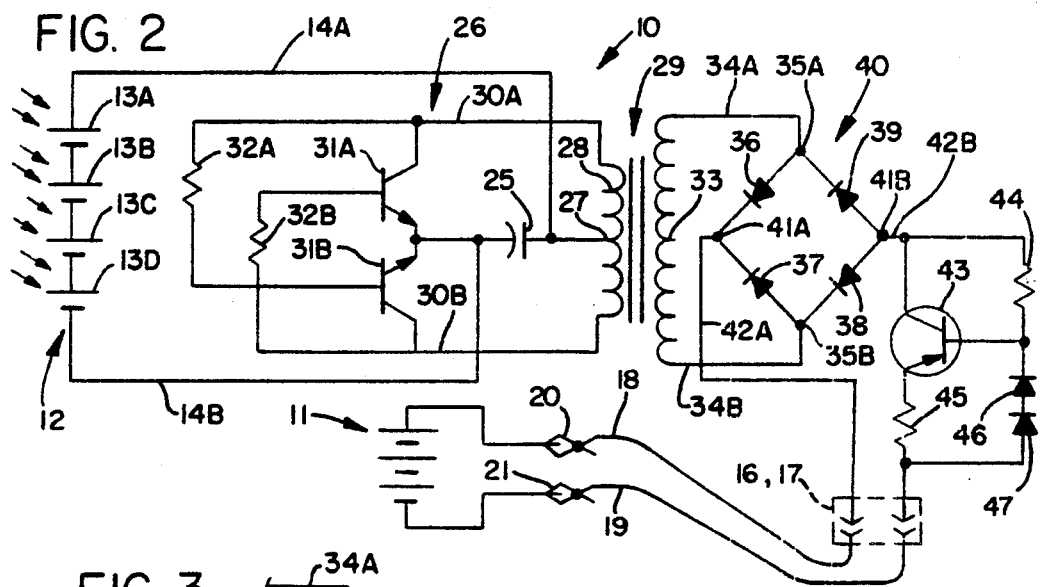
Figure 3:
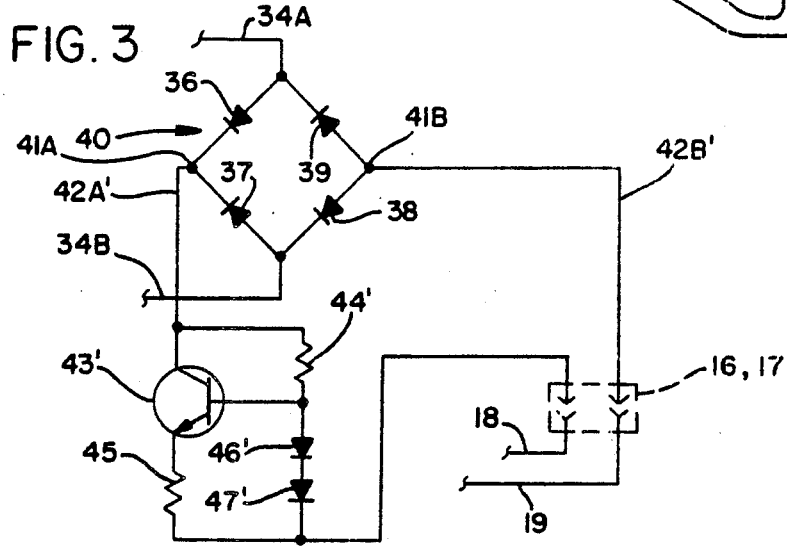

In the drawing:

FIG. 1 represents a perspective view of a solar powered lead acid battery combination rejuvenator and trickle charger;

FIG. 2, a schematic view of the solar powered lead acid battery combination rejuvenator and trickle charger circuit; and, FIG. 3, a partial schematic view of another battery combination rejuvenator and trickle charger circuit with a battery circuit connection from an AC to DC rectifying diode bridge circuit including a NPN transistor with bias resistors and one or more diodes connected to protect against reverse wrongful connection to a battery.

Referring to the drawing:

The solar powered combination rejuvenator and trickle charger 10, of FIG. 1, for lead acid batteries 11 is shown to have a solar cell panel 12 with four solar cells 13A, 13B, 13C and 13D connected through a two wire cable 14 to a circuit box 15. A connector element 16 on the circuit box 15 may be inserted into a connector receptacle 17 having clip wires 18 and 19 extended to clips 20 and 21. The connector element 16 also may be sized and configured to fit in a vehicle cigarette lighter receptable 22 that has wire 23 and wire 24 connections to opposite ends of vehicle lead acid battery 11.

Referring also to FIG. 2 the combination rejuvenator and trickle charger 10 is constantly acting in a rejuvenator operational mode while at the same time feeding a net trickle charge to lead acid. This is batteries 11 with the number of cells in the multi-solar cell panel 12 reduced to as low as four cells 13A, 13B, 13C and 13D so series connected together that they as low voltage high current solar cells together produce 1 to 2 volts with 1 to 2 amps output. The multi-solar cell panel 12 is connected through wires 14A and 14B of connecting cable 14 to opposite sides of capacitor 25 in DC to AC inverter multi-vibrator circuit 26. Wire 14A is also connected to the center tap of primary coil 28 in transformer 29, and wire 14B is also connected to the common junction of the emitters of NPN transistors 31A and 31B. The opposite ends of coil 28 are connected through lines 30A and 30B to the collectors, respectively, of transistors 31A and 31B, and on, respectively, through resistors 32A and 32B to the bases of NPN transistors 31B and 31A.

The secondary coil 33 of transformer 29 has a higher turn ratio in the order of 6 (within the range of four to eight times) to 1 than the primary coil 28 such as to produce an output unloaded voltage in the range of some thirty to forty volts AC, and has its opposite ends connected through lines 34A and 34B to two opposite terminals 35A and 35B of a four diode 36, 37, 38 and 39 AC to DC rectifier bridge 40. The other two opposite terminals 41A and 41B of the AC to DC rectifier bridge 40 are connected to lines 42A and 42B having connectors 16 (17) to and through lines 18 and 19 to connection by clips 20 and 21 to, respectively, the positive and negative terminals of battery 11. The line 42B battery connection from the bridge 40 includes connection to the collector of PNP transistor 43 and connection through a voltage bias resistor 44 to the transistor base. In addition a resistor 45 is connected between the emitter of PNP transistor 43 and the negative terminal of the battery 11, and two diodes 46 and 47 are serially connected anodes toward the battery 11 and cathodes toward the base of PNP transistor 43. The diodes 46 and 47 protect the PNP transistor 43 from burn-out damage when leads 18 and 19 are mistakenly connected to the battery 11 in reverse. It should be noted that the transformer 29 has a primary coil 28 to secondary coil turns ratio of approximately 1 to 6 (at least within a range of four to eight times to one) and has a ferrite ceramic core element as an aid for the transformer 29 being a fast rise time transformer in the order of two nano seconds per volt rise.

The combination rejuvenator and trickle charger embodiment of FIG. 3 is the same as that of the FIG. 2 embodiment to and through the bridge circuit 40 of each. However, the bridge terminal 41A is connected to the collector of NPN transistor 43' and through bias resistor 44' to the transistor base. The emitter of transistor 43' is connected through resistor 45 and the base through serially connected diodes 46' and 47' to lead 18 and the positive battery terminal connection 20.

Typical values for components in both embodiments include:

Capacitor 25: 450 μf at 6 volts
Resistors 32A and 32B: 22 Ohms
Diodes 36, 37, 38 and 39: 1 amp Diodes
Resistors 44, 44': 1500 Ohms
Resistors 45, 45': 10 Ohms Both the FIGS. 2 and 3 embodiments are basically the same with output circuitry from the diode bridge 40 including PNP transistor 43 in FIG. 2 and NPN transistor 43' in FIG. 3, reverse diode 46 and 47 to 46' and 47' orientation from one to the other, and reverse mirror image resistor configuration between lead 42B and 42A connections. While the combination rejuvenation and trickle charge operation with the embodiments shown is structured for twelve volt batteries, the basic circuitry may be change adapted for six volt a or twenty four volt batteries by changing the turns ratio in transformer 29 and the bias value resistance of resistors 32A and 32B. In order for the combination lead acid battery combination rejuvenator and trickle charger circuit to provide fast rise time very short pulse to a battery in the approximate range of from 2,000 to 10,000 times per second the DC to AC inverter multivibrator circuit 26 must operate in the approximate range of from 1,000 to 5,000 cycles per second.

Whereas this invention has been described with respect to two embodiments thereof, it should be realized that various changes may be made without departure from the essential contributions to the art made by the teachings hereof.

I claim:

1. A solar powered combination rejuvenator and trickle charger for lead acid batteries comprising: a multi-solar cell power source circuit; a DC to AC inverter multi-vibrator circuit connected to said multi-solar cell power source; a transformer with a primary coil a part of said DC to AC inverter multi-vibrator circuit, and having a secondary coil; a four diode rectifier bridge circuit having a first set of opposite terminals connected to said secondary coil, and a second set of opposite terminals; first connection means for connecting a first one of the terminals of said second set of bridge opposite terminals to a first terminal of a lead acid battery and second connection means for connecting the second of the terminals of said second set of bridge opposite terminals to the second terminal of the lead acid battery; one of said first and second connection means includes connection of a terminal of said second set of bridge opposite terminals to the collector of a transistor and through a voltage bias resistor to the transistor base; connection of the transistor emitter through resistive means to a battery terminal connector; and connection of said transistor base through diode means to said battery terminal connector.

2. The solar powered combination rejuvenator and trickle charger of claim 1, wherein there is a higher turns ratio with more turns in said secondary coil than in said primary coil in the order of four to eight times the turns of said primary coil yielding a higher AC voltage output from said secondary coil.

3. The solar powered combination rejuvenator and trickle charger of claim 2, wherein the core of said transformer is a ferrite ceramic core element as an aid making the transformer a fast rise time transformer in the approximate order of two nano seconds per volt rise.

4. The solar powered combination rejuvenator and trickle charger of claim 3, wherein said DC to AC inverter to multi-vibrator circuit includes two transistors having a common electrode connection of first electrodes of said transistors with said common electrode connection in turn connected to a first side of a capacitor having a second side connected to a tap of said primary coil; said multi-solar cell power source circuit having a first lead and a second lead with said first lead connected to the junction of said capacitor and said tap of said primary coil; and with said second lead connected to the junction of said first electrodes of said transistors common connection and said capacitor; and with opposite ends of said primary coil connected to second electrodes of said transistors and to resistors connected to the bases, respectively, of said transistors.

5. The solar powered combination rejuvenator and trickle charger of claim 4, wherein said multi-solar cell power source circuit has four series connected solar cells.

6. The solar powered combination rejuvenator and trickle charger of claim 4, wherein said two transistors are NPN type transistors with said common electrode connection of said transistors being a connection between the emitters of said two transistors.

7. The solar powered combination rejuvenator and trickle charger of claim 6, wherein the opposite ends of said primary coil are connected to the collectors of said NPN transistors and each, also on through said voltage bias resistors, respectively, to the base of a transistor of said two transistors.

8. The solar powered combination rejuvenator and trickle charger of claim 7, wherein a resistor is included in connection means to a battery.

9. The solar powered combination rejuvenator and trickle charger of claim 2, wherein said DC to AC inverter multi-vibrator circuit includes two transistors having a common electrode connection of first electrodes of said transistors with said common electrode connection in turn connected to a first side of a capacitor having a second side connected to a tap of said primary coil; said multi-solar cell power source circuit having a first lead and a second lead with said first lead connected to the junction of said capacitor and said tap of said primary coil; and with said second lead connected to the junction of said first electrodes of said transistors common connection and said capacitor; and with opposite ends of said primary coil connected to second electrodes of said transistors and to resistors connected to the bases, respectively, of said transistors.

10. The solar powered combination rejuvenator and trickle charger of claim 9, wherein said two transistors in said DC to AC inverter multi-vibrator circuit are NPN type transistors with said common electrode connection of said transistors being a connection between the emitters of said two transistors.

11. The solar powered combination rejuvenator and trickle charger of claim 10, wherein the opposite ends of said primary coil are connected to the collectors of said NPN transistors and each, also on through said voltage bias resistors, respectively, to the base of a transistor of said two transistors.

12. The solar powered combination rejuvenator and trickle charger of claim 11, wherein said transistor in said connection means is a PNP transistor; and said diode means is connected cathode to the base of said transistor in said connection means and anode to said battery terminal connector.

13. The solar powered combination rejuvenator and trickle charger of claim 12, wherein said diode means is a plurality of diodes serially connected diode cathode to diode anode.

14. The solar powered combination rejuvenator and trickle charger of claim 12, wherein said diode means is two diodes serially connected diode cathode to diode anode.

15. The solar powered combination rejuvenator and trickle charger of claim 11, wherein said transistor in said connection means is a NPN transistor; and said diode means is connected cathode to the base of said transistor in said connection means and anode to said battery terminal connector.

16. The solar powered combination rejuvenator and trickle charger of claim 15, wherein said diode means is a plurality of diodes serially connected diode cathode to diode anode.

17. The solar powered combination rejuvenator and trickle charger of claim 15, wherein said diode means is two diodes serially connected diode cathode to diode anode.

* * * * *